United States Patent
Engelhardt et al.

(10) Patent No.: US 7,031,055 B2
(45) Date of Patent: Apr. 18, 2006

(54) MICROSCOPE

(75) Inventors: Johann Engelhardt, Bad Schoenborn (DE); Joachim Bradl, Schriesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/717,524

(22) Filed: Nov. 21, 2003

(65) Prior Publication Data

US 2004/0114225 A1 Jun. 17, 2004

Related U.S. Application Data

(62) Division of application No. 09/549,026, filed on Apr. 13, 2000, now Pat. No. 6,678,089.

(30) Foreign Application Priority Data

Mar. 27, 1999 (DE) ................................ 199 14 049

(51) Int. Cl.
*G02B 21/06* (2006.01)
(52) U.S. Cl. ..................................... 359/385; 359/368
(58) Field of Classification Search ................ 359/368, 359/389, 390, 372, 388, 385, 820, 513, 514
See application file for complete search history.

(56) References Cited

U.S. PATENT DOCUMENTS

| | | | |
|---|---|---|---|
| 2,146,506 A | 2/1939 | Maisch | 359/388 |
| 3,518,014 A | 6/1970 | Weber | 356/629 |
| 4,148,552 A | 4/1979 | Suzuki et al. | 359/388 |
| 4,405,202 A | 9/1983 | Kimball | 359/513 |
| 4,621,911 A | 11/1986 | Lanni et al. | 350/524 |
| 4,720,168 A | 1/1988 | Kaneko | 359/820 |
| 4,729,646 A | 3/1988 | Clark et al. | 359/368 |
| 5,059,010 A | 10/1991 | Yomoda | 359/372 |
| 5,386,112 A | 1/1995 | Dixon | 250/234 |
| 5,412,510 A | 5/1995 | Iizuka et al. | 359/820 |
| 5,585,964 A | 12/1996 | Schalz | 359/368 |
| 5,671,085 A | 9/1997 | Gustafsson et al. | 359/385 |
| 5,691,839 A | 11/1997 | Kobayashi | 359/385 |
| 5,801,881 A | 9/1998 | Lanni et al. | 359/386 |
| 5,856,883 A | 1/1999 | Sander | 359/389 |

FOREIGN PATENT DOCUMENTS

| | | | |
|---|---|---|---|
| EP | 0 491 289 | 6/1992 | |
| JP | 58-172604 | 10/1983 | 359/820 |

*Primary Examiner*—Euncha P. Cherry
(74) *Attorney, Agent, or Firm*—Foley & Lardner LLP

(57) ABSTRACT

A microscope (1), preferably a confocal laser scanning microscope, having at least one light source, a detector, and two objectives (2), one of the objectives (2) being arranged on each of the two sides of the specimen plane (3) and the objectives (2) being directed toward one another and having a common focus; and at least one beam splitter (5) for distributing the illuminating light (6) to the objectives (2), and a beam recombiner (5) for combining the detected light (7) coming from the objectives (2), being provided in the illumination/detection beam path (4), is characterized, for selectable, subsequent implementation of ultrahigh-resolution microscope techniques, in that the objectives (2) and the beam splitter/beam recombiner (5) are grouped into a modular assembly (8); and the assembly (8) has an interface (9) for connection to the illumination/detection beam path (4) of the microscope (1).

26 Claims, 1 Drawing Sheet

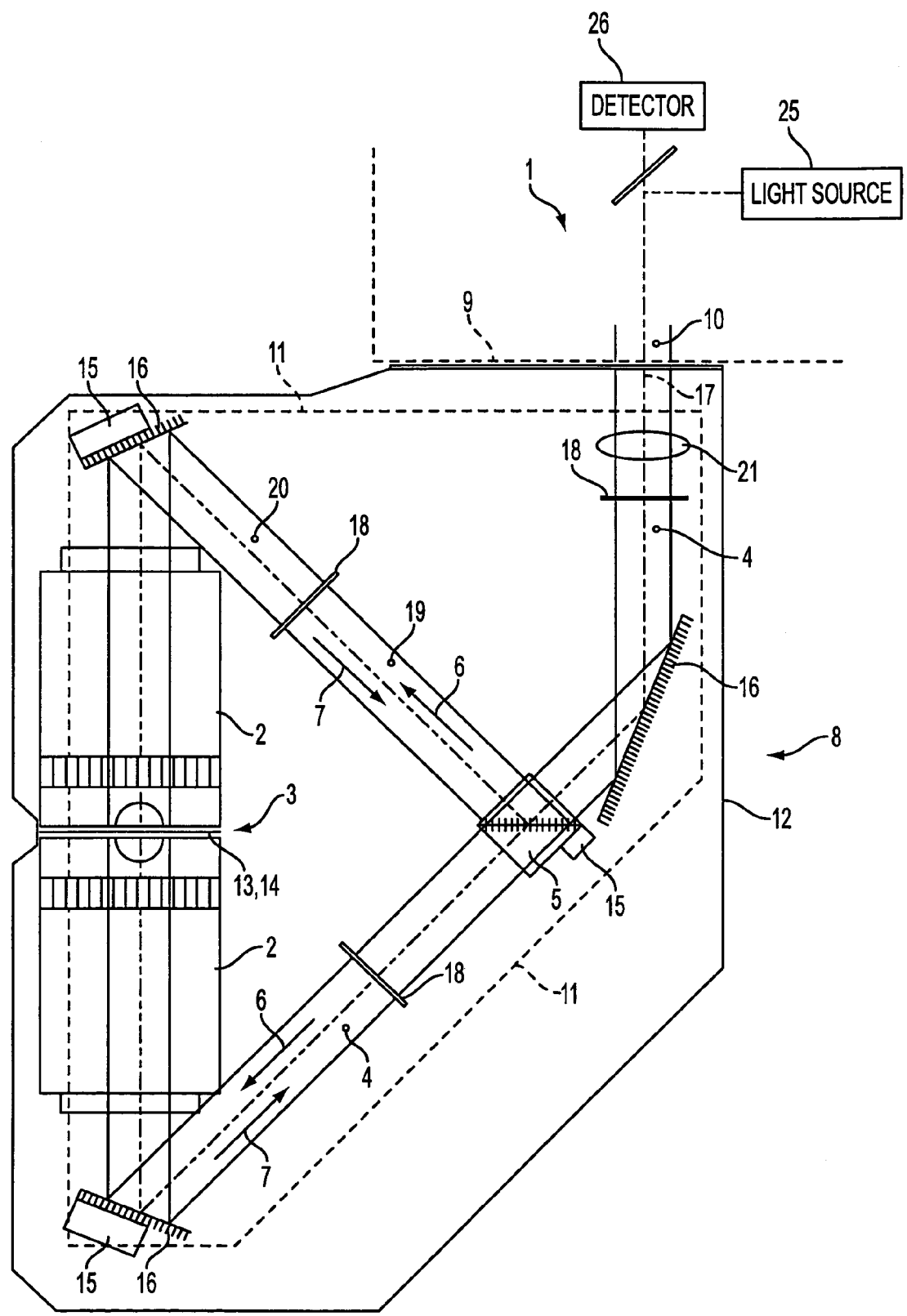
Figure

MICROSCOPE

CROSS REFERENCE TO RELATED APPLICATIONS

The present application is a divisional of U.S. application Ser. No. 09/549,026, filed Apr. 13, 2000, now U.S. Pat. No. 6,678,089, the entire contents of which are incorporated herein by reference.

This invention claims priority of a German filed patent application DE-A-199 14 049.9.

FIELD OF THE INVENTION

The invention concerns a microscope, preferably a confocal laser scanning microscope, having a light source, a detector, and two objectives, one of the objectives being arranged on each of the two sides of the specimen plane and the objectives being directed toward one another and having a common focus, and at least one beam splitter for distributing the illuminating light to the objectives, and a beam recombiner for combining the detected light coming from the objectives, being provided in the illumination/detection beam path.

BACKGROUND OF THE INVENTION

Microscopes of the generic type, in particular microscopes in which two objectives that are directed toward one another and have a common focus in the image plane are provided, have been known in practical use for some time. Reference is made in this context, merely by way of example, to EP 0 491 289 B1. This document discloses a double confocal scanning microscope having the generic features. Specifically, what is described therein is a scanning microscope in which a non-polarizing beam splitter apparatus is provided to split the illuminating light into coherent portions. The beam splitter apparatus serves to illuminate the objectives directed toward one another, and to combine mutually coherent light beams from the objectives that are directed toward one another. High resolution can be obtained with the optical components implemented therein.

The microscope known from EP 0 491 289 B1 is a so-called "high-end" microscope, in which an interferometric beam path is implemented. A microscope of this kind is of extremely complex design and is therefore—even in its basic version—expensive compared to conventional microscopes. In addition, these "high-end" microscopes are special constructions that require a great deal of room on optical benches and accordingly are also very susceptible to external influences. Above all, however, the "high-end" microscopy provided for therein requires a special microscope, with no possibility of using conventional microscopes with their capabilities.

SUMMARY OF THE INVENTION

It is therefore the object of the present invention to be able to implement the ultrahigh-resolution microscope technique known from the generic existing art in conventional microscopes, for example in confocal laser scanning microscopes, in particular also by retrofitting.

The aforesaid object is achieved by a microscope which comprises at least one light source, at least one detector, and two objectives, one of the objectives being arranged on each of the two sides of the specimen plane and the objectives being directed toward one another and having a common focus; at least one beam splitter for distributing the illuminating light to the objectives, and a beam recombiner for combining the detected light coming from the objectives, being provided in the illumination/detection beam path; a modular assembly for grouping the objectives and the beam splitter/beam recombiner therein and an interface is provided with the modular assembly for connection to the illumination/detection beam path of the microscope.

In addition, the above object is achieved by a confocal laser scanning microscope comprising at least one detector, and two objectives, one of the objectives being arranged on each of the two sides of the specimen plane and the objectives being directed toward one another and having a common focus; at least one beam splitter for distributing the illuminating light to the objectives, and a beam recombiner for combining the detected light coming from the objectives, being provided in the illumination/detection beam path; a modular assembly for grouping the objectives and the beam splitter/beam recombiner therein and an interface is provided with the modular assembly for connection to the illumination/detection beam path of the microscope.

According to the present invention, it has firstly been recognized that conventional microscopes, for example confocal laser scanning microscopes, can be equipped at a later time with ultrahigh-resolution microscope techniques without thereby sacrificing the actual nature of the conventional microscope. It has furthermore been recognized that ultrahigh-resolution microscope techniques can be implemented in conventional microscopes even after the fact, specifically by the fact that the essential components that are responsible for the ultrahigh-resolution microscope technique are grouped into a retrofittable assembly. According to the present invention, therefore, the objectives and the beam splitter/beam recombiner are grouped into a modular assembly. This assembly has an interface for connection to the illumination/detection beam path of the microscope. Considered in and of itself, the modular assembly can be handled independently and can be connected with its interface to the microscope, a connection to the illumination/detection beam path being indispensable.

Advantageously, the assembly can be introduced with its interface into the microscope stand in place of a conventional objective or objective nosepiece, and thereby connected into the microscope (into its illumination/detection beam path). Conversion can thus be accomplished in simple fashion, namely after removing the objective or objective nosepiece, thereby making possible connection of the high-end assembly under discussion here.

In terms of a concrete embodiment of the assembly comprising the optical components, the components of the assembly are mounted on a baseplate. To prevent any temperature-related change in the beam path, it is particularly advantageous if the baseplate is manufactured from a material having a low coefficient of thermal expansion. Materials such as Invar or Super-Invar are thus suitable. These materials have almost no thermal expansion over the range of temperatures occurring here, so that any temperature-related change in the beam path or any corresponding misalignment can be almost ruled out.

In terms of particular secure positioning of the optical assembly, it is further advantageous if the optical components of the assembly—preferably arranged on the baseplate—are arranged in a housing. To eliminate external influences, the housing could be hermetically sealed. Thermal insulation is also advantageous, specifically in order effectively to eliminate external temperature influences on the alignment.

In order effectively to prevent any misalignment, it would be possible to define inside the housing a defined temperature in whose vicinity the beam is aligned. In order to maintain this temperature, the optical assembly could comprise a component having a defined and at least largely constant heat emission. The heat-emitting component would need to be dimensioned so that it is suitable for keeping the assembly at a constant operating temperature, specifically in consideration of the thermal insulation possibly implemented therein. The heat-emitting component could be a laser light source, preferably a diode laser.

A further possibility for eliminating any misalignment due to thermal expansion is that the optical components of the assembly are designed, and are installed and arranged on the baseplate (optionally by way of special holders), in such a way that temperature-related expansions compensate for one another and therefore have no effect on the optical alignment state of the assembly. Very particularly, this can be implemented if individual components are designed such that they exhibit exclusively a linear expansion, i.e. an expansion in one direction. By way of corresponding end-located mounts and expansion characteristics in opposite directions from one another, it is possible for mutual compensation to occur as the temperature changes, with no change in the beam path. This action, too, at least largely prevents any misalignment.

The optical assembly could have further optical components in addition to the two objectives directed oppositely to one another and the beam splitter/beam recombiner. A further component that advantageously is also an integral constituent of the assembly is the specimen stage that is arranged between the objectives. When the assembly or the housing is connected to the microscope, the specimen stage is oriented horizontally so that the specimens to be examined can be placed in conventional fashion on the stage.

It is furthermore advantageous if the specimen stage is accessible from outside the housing. The specimen stage can thus be operated from outside, in particular can be loaded with the specimen to be examined, with no need to open the housing for that purpose. In the context of such an arrangement, the specimen stage and the specimen lying thereupon are protected by the housing.

The specimen stage could not only be loaded with a specimen from outside the housing, but also could be adjustable or displaceable from outside the housing. The specimen stage could be motor-driven for that purpose; an actuation member, preferably in the form of a joystick or trackball, can be provided for actuation of the specimen stage.

The assembly containing the optical components could furthermore comprise an optical system for displacing the pupil of the objectives used in the assembly. This makes possible adaptation to the beam path that has now been enlarged by the assembly. The optical system for displacing the pupil could be implemented by. way of a virtual image or a real intermediate image. Concretely, the displacement of the pupil could be implemented by way of an optical system arranged in the illumination/detection beam path close to the coupling-in point. It is also conceivable for displacement of the pupil to be implemented by replacing the tube lens of the microscope. What is essential in this context is that a displacement of the pupil for adaptation purposes following introduction of the assembly into the microscope stand in place of the objective nosepiece is possible, specifically an adaptation of the position of the pupil of the objectives, since the objectives in the assembly, for example in an interferometer module, are farther away from the microscope stand than is the case in the conventional operating mode with objective nosepieces. Replacement of the tube lens, which could be arranged on a suitable lens wheel, is conceivable in principle.

The assembly could moreover comprise a mirror, arranged in the illumination/detection beam path, for deflecting the illumination/deflection beam. A compact design for the assembly can be achieved by using a mirror of this kind and by way of the resulting deflection of the beam.

A shutter could be arranged in the illumination/detection beam path between the coupling-in point and the beam splitter, preferably between the coupling-in point and the aforementioned mirror, specifically in order to block the beam or at least a partial beam.

A mirror could then once again be provided directly in front of the two objectives in order to deflect the illumination/detected light. These two mirrors then also serve to bring about a compact design for the entire assembly, allowing a reduction in the size of the housing required. A shutter can then once again be provided in the illumination/detection beam path between the beam splitter and the mirror, serving again to block or partially block the light beam in accordance with the requirements of the specific application.

It is furthermore conceivable for the assembly to comprise optical components in order to influence interference phenomena, in particular for phase compensation, specifically in order to implement an interferometric beam path. Very particularly, interferometers could be integrated for this purpose, for example Sagnac, Michelson, Twyman-Green, or Mach-Zehnder interferometers that are very particularly suitable for creating an interferometric beam path. The assembly could also comprise optical components for implementing 4Pi, SWFM, $I^2M$, $I^3M$, or $I^5M$ microscope technology, these being extremely complex "high end" microscope technologies using a wide variety of microscope methods. For all these methods, it is essential to work with objectives directed toward one another.

In further advantageous fashion, the essential optical components of the assembly can be positioned for alignment purposes, specifically by way of actuators associated with the components. These actuators could be actuable via control units; the control units could be provided outside the assembly or inside the assembly (integrated thereinto). Particularly advantageously, the actuators are computer-controlled so that alignment can be accomplished by way of a suitable computer program. Corresponding user guidance for alignment purposes is conceivable.

Various parameters of the operating state of the assembly could moreover be detectable by way of detectors, the detectors being integral constituents of the assembly. These can be mechanical, electronic, and/or optical sensors that are particularly suitable for detection of the respective parameters for the purpose of ascertaining the operating state of the assembly. Automatic alignment of the system or the module is thereby possible.

As already mentioned above, the assembly could comprise its own light source, this light source being capable simultaneously of providing temperature control of the assembly. This light source could furthermore serve to generate an auxiliary beam for alignment of the components. The auxiliary beam could, in this context, be generated as an interferometric beam, the light source being an integral constituent of the assembly. It is also conceivable to couple the light source into the assembly as an external light source, any desired light source regardless of size being possible in this context. Coupling-in by way of optical fibers is conceivable.

The light source could be embodied as a solid-state laser, diode laser, or gas laser.

Lastly, be it noted that the assembly could comprise a fluorescent incident-light unit, a binocular tube, and/or an interface to a confocal unit. Further embodiments utilizing conventional microscope techniques are conceivable.

BRIEF DESCRIPTION OF THE DRAWINGS

There a various possibilities for advantageously embodying and developing the teaching of the present invention. Reference is made for this purpose on the one hand to the claims which follow Claim 1, and on the other hand to the explanation below of an exemplary embodiment of the invention referring to the drawings. In conjunction with the explanation of the preferred exemplary embodiment of the invention referring to the drawings, a general explanation will also be given of preferred embodiments and developments of the teaching. In the drawings:

the single FIGURE shows, in a schematic depiction, the general configuration of the optical assembly which contains the optical components and which, as a result of its modular design, can be connected (at a later time) to the microscope (merely indicated).

DETAILED DESCRIPTION OF THE INVENTION

In the schematic depiction of the FIGURE, the region relevant to the conventional microscope 1 is merely indicated. In the exemplary embodiment depicted here, the latter is a confocal laser scanning microscope. This laser scanning microscope comprises a light source (not shown in the FIGURE), a detector (also not shown in the FIGURE), and at least two objectives 2, one of the objectives 2 being arranged on each of the two sides of specimen plane 3. The two objectives 2 are directed toward one another and have a common focus.

The FIGURE furthermore shows that at least one beam splitter 5 for distributing illuminating light 6 to objectives 2, and a beam recombiner 5 for combining detected light 7 arriving from objectives 2, is provided in illumination/detection beam path 4. Be it noted in this context that the beam splitter and beam recombiner 5 can be a single optical component, as shown in the FIGURE.

According to the present invention, objectives 2 and beam splitter/beam recombiner 5 are grouped into a modular assembly 8, assembly 8 having an interface 9 for connecting to illumination/detection beam path 10 of microscope 1.

In microscope 1 according to the present invention, the relatively complex portion of the interference microscope, i.e. the assembly containing the corresponding optical components, is of modular configuration, so that modular assembly 8 can in principle be connected to a conventional microscope. As a result, a (usually expensive) research microscope can be used not only in conventional operating modes but also for high-resolution microscope operation, specifically by being modified by way of the connectable modular assembly. Conventional assemblies of a microscope can thus also be used for ultrahigh-resolution microscope module operation. The illumination could, for example, be implemented with a high-pressure vapor light source already associated with the microscope. It is also conceivable to locate the specimen in the conventional fluorescent incident-light beam, and then set the parameters of the entire microscope system for data recording with the ultrahigh-resolution module. The relevant portion of the specimen being examined could also be recorded or delimited. Modular assembly 8 could in principle be used for all microscope methods that use two microscope objectives directed toward one another. These are, in particular, the 4Pi, SWFM, $I^2M$, $I^3M$, and $I^5M$ microscope technologies. Reference is made, purely by way of example, to EP 0 491 289 B1, U.S. Pat. No. 4,621,911, and U.S. Pat. No. 5,671,085 regarding these microscope technologies. In particular, it is possible with this module to image the specimen in two or three dimensions using either the specimen scanning method or the beam scanning method.

In the case of the exemplary embodiment shown in the FIGURE of a microscope according to the present invention and of modular assembly 8 relevant therein in a manner essential to the invention, the optical components are mounted on a baseplate 11. This baseplate 11 is manufactured from a material having a low coefficient of thermal expansion. The material of the baseplate may be Invar. In the preferred embodiment the material of baseplate 11 is Super-Invar.

Modular assembly 8 or baseplate 11 having the optical components is arranged in a housing 12 which is thermally insulated. Because the fact that baseplate 11 expands insignificantly in response to temperature change is utilized, and as a result of measures taken in housing 12, limited temperature fluctuations in the vicinity of the microscope do not have a disruptive effect on the aligned beam path of modular assembly 8 or of the interferometer implemented therein.

For further elimination of the influence of temperature fluctuations in the vicinity of the microscope, it is advantageous if the optical components are secured or positioned by way of very particular mounts, and if these in turn are designed and secured to baseplate 11 in such a way that material expansions due to temperature fluctuations are almost completely compensated for, so that there is no influence on the optical alignment state of assembly 8 as the temperature changes.

As already mentioned earlier, the housing could be sealed in hermetic (airtight) fashion, so that air flows in the vicinity of microscope 1 cannot have any disruptive effect on the beam path of the interferometer. Components that act as heat sources and cause assembly 8 to be heated to an irregular degree therefore should not be installed and operated inside assembly 8, especially since the interferometric beam path is influenced thereby. It is, however, advantageous if, for example, a diode laser with a defined, constant heat emission is provided as an integral constituent of assembly 8, since it has an additional temperature-stabilizing effect on assembly 8. Assembly 8 together with specimen 13 that is being examined could thus be held at an operating temperature that is favorable in this regard, for example at 37° C. for so-called "in vivo" specimens.

It is furthermore evident from the FIGURE that a modified specimen stage 14 is provided. Specimen stage 14 extends horizontally between the two objectives 2. The specimen stage 14 is accessible from outside the housing 12 as well as adjustable. Furthermore, the specimen stage 14 is motor-driven. This creates a utilization situation that is familiar to the operator, since it is that which exists in ordinary microscopes. For positioning relative to objectives 2, specimen stage 14 can be operated by the operator in manual or motorized fashion. Suitable control elements (not shown in the FIGURE) include a joystick or a trackball with which a motorized control system can be activated and controlled.

It is further indicated in the FIGURE that assembly 8 or (at least some of) the optical components comprising assembly 8 are equipped with actuators 15 that serve to influence the interferometer. Actuators 15 serve to position specimen stage 14 (the actuators serving to actuate the specimen stage are not shown in the FIGURE), mirror 16 provided therein, and beam splitter/beam recombiner 5 in illumination/detection beam path 4, whose optical axis 17 is also indicated in the FIGURE for purposes of clarity. Actuation of objectives 2 by way of actuators (not shown in the FIGURE) is also possible.

The control units of actuators 15 are arranged outside of assembly 8, activation of actuators 15 being accomplished under computer control.

Shutters 18 shown in the FIGURE serve to block light beam 19 or at least a partial beam 20. These shutters 18 are also associated with modular assembly 8.

The concrete exemplary embodiment shown in the single FIGURE refers to a combination of an ultrahigh-resolution 4Pi microscope module (modular assembly 8) with a conventional confocal laser scanning microscope (CLSM). The modular assembly is provided in housing 12 in place of the objective nosepiece (not shown in the FIGURE), modular assembly 8 being, with the aid of the compatible interface 9, inserted into microscope 1 or connected to the microscope stand. It is thus advantageous to use the eyepiece in the conventional microscope mode, in particular to locate and/or delimit the specimen. With the arrangement proposed here it is furthermore possible to record a two- or three-dimensional image in the conventional confocal laser scanning microscope.

The FIGURE also schematically shows optical system 21, provided for pupil displacement, for objectives 2 used in assembly 8. The introduction of assembly 8 into the microscope stand in place of the objective nosepiece otherwise provided there requires an adaptation of the position of the pupils of objectives 2, since in the interferometer module (modular assembly 8) shown here, they are located farther away from the microscope stand than is the case in the conventional operating mode. A pupil displacement of this kind can be brought about by way of a real or a virtual intermediate image. It is also possible to replace the tube lens, which can be arranged in the microscope stand on a suitable lens wheel (also not shown in the FIGURE). A virtual pupil displacement could thereby advantageously be implemented by replacing the tube lens, with no need to take more extensive actions.

In conclusion, be it noted very particularly that the exemplary embodiment set forth above serves merely to describe the teaching claimed, but does not limit it to the exemplary embodiment selected in purely random fashion.

PARTS LIST

1 Microscope (conventional portion)
2 Objectives
3 Specimen plane
4 Illumination/detection beam (in the modular assembly)
5 Beam splitter/beam recombiner
6 Illuminating light
7 Detected light
8 Modular assembly
9 Interface for connecting to microscope
10 Illumination/detection beam (of microscope)
11 Baseplate (for optical components of modular assembly)
12 Housing (for optical components of modular assembly)
13 Specimen (sample)
14 Specimen stage
15 Actuators
16 Mirrors
17 Optical axis (of illumination/detection beam)
18 Shutter
19 Light beam
20 Partial beam
21 Optical system (for pupil displacement)

What is claimed is:

1. A confocal laser scanning microscope comprising at least one detector, and two objectives, one of the objectives being arranged on each of the two sides of the specimen plane and the objectives being directed toward one another and having a common focus; at least one beam splitter for distributing the illuminating light to the objectives, and a beam recombiner for combining the detected light coming from the objectives, being provided in the illumination/detection beam path; a modular assembly for grouping the objectives and the beam splitter/beam recombiner therein and an interface is provided with the modular assembly for connection to the illumination/detection beam path of the microscope wherein the modular assembly has a baseplate on which optical components of the modular assembly are mounted, and wherein the optical components of the modular assembly are designed, and are installed and arranged on the baseplate, in such a way that temperature-related expansions compensate for one another and therefore have no effect on the optical alignment state of the modular assembly.

2. The confocal laser scanning microscope as defined in claim 1, wherein the modular assembly is connected with its interface instead of a conventional objective or objective nosepiece to the microscope.

3. The confocal laser scanning microscope as in claim 1, wherein the optical components of the modular assembly are arranged in a housing.

4. The confocal laser scanning microscope as defined in claim 3, wherein the housing is hermetically sealed.

5. The confocal laser scanning microscope as defined in claim 1, wherein the modular assembly comprises a specimen stage that is arranged between the objectives.

6. The confocal laser scanning microscope as defined in claim 1, wherein the modular assembly comprises an optical system for displacing the pupil of the objectives used in the modular assembly.

7. The confocal laser scanning microscope as defined in claim 6, wherein the optical system for displacing the pupil is implemented by way of a virtual image.

8. The confocal laser scanning microscope as defined in claim 6, wherein the optical system for displacing the pupil is implemented by way of a real intermediate image.

9. The confocal laser scanning microscope as defined in claim 6, wherein displacement of the pupil is implemented by replacement of the tube lens of the microscope.

10. The confocal laser scanning microscope as defined in claim 6, wherein displacement of the pupil is implemented by way of an optical system arranged in the illumination/detection beam path close to the coupling-in point.

11. The confocal laser scanning microscope as defined in claim 1, wherein the modular assembly comprises at least one mirror, arranged in the illumination/detection beam path, for deflecting the illumination/deflection beam.

12. The confocal laser scanning microscope as defined in claim 11, wherein a shutter is arranged in the illumination/ detection beam path between the coupling-in point and the beam splitter, preferably between the coupling-in point and the mirror.

13. The confocal laser scanning microscope as defined in claim 12, wherein a mirror is placed in front of each of the objectives in order to deflect the illumination/detected light.

14. The confocal laser scanning microscope as defined in claim 13, wherein the modular assembly comprises a shutter in the illumination/detection beam path between the beam splitter and the mirror.

15. The confocal laser scanning microscope as defined in claim 12, wherein the modular assembly comprises optical components in order to influence interference phenomena, in particular for phase compensation.

16. The confocal laser scanning microscope as defined in claim 15, wherein the modular assembly comprises an interferometer which consists essentially of a Sagnac, Michelson, Twyman-Green, and Mach-Zehnder interferometer for creating an interferometric beam path.

17. The confocal laser scanning microscope as defined in claim 1, wherein the modular assembly comprises optical components for implementing 4Pi, SWFM, $I^2M$, $I^3M$, or $I^5M$ microscope technology.

18. The confocal laser scanning microscope as defined in claim 1, wherein an actuator is associated respectively with individual components for the positioning of individual components and/or for alignment of the assembly.

19. The confocal laser scanning microscope as defined in claim 1, wherein detectors are provided for the detection of various parameters of the operating state of the modular assembly.

20. The confocal laser scanning microscope as defined in claim 19, wherein the detectors consist essentially of mechanical, electronic, and optical sensors.

21. The confocal laser scanning microscope as defined in claim 1, wherein at least one light source, with which an auxiliary beam can be generated for alignment of the components, is provided for the modular assembly.

22. The confocal laser scanning microscope as defined in claim 21, wherein the auxiliary beam is generated as an interferometric beam, and alignment is accomplished automatically.

23. The confocal laser scanning microscope as defined in claim 21, wherein the light source is an integral constituent of the modular assembly.

24. The confocal laser scanning microscope as defined in claim 21, wherein the light source is an external light source and coupled into the modular assembly.

25. The confocal laser scanning microscope as defined in claim 21, wherein the light source consists essentially of a solid-state laser, diode laser, and a gas laser.

26. The confocal laser scanning microscope as defined in claim 1, characterized by a fluorescent incident-light unit, a binocular tube, and an interface to a confocal unit.

* * * * *